(12) United States Patent
Osada

(10) Patent No.: US 7,650,988 B2
(45) Date of Patent: Jan. 26, 2010

(54) DISC CASE

(75) Inventor: Toyotoshi Osada, Yao (JP)

(73) Assignee: INAC Co., Ltd., Osaka (JP)

( * ) Notice: Subject to any disclaimer, the term of this patent is extended or adjusted under 35 U.S.C. 154(b) by 150 days.

(21) Appl. No.: 11/664,413

(22) PCT Filed: Nov. 15, 2005

(86) PCT No.: PCT/JP2005/020916

§ 371 (c)(1),
(2), (4) Date: May 10, 2007

(87) PCT Pub. No.: WO2006/051978

PCT Pub. Date: May 18, 2006

(65) Prior Publication Data

US 2008/0121539 A1 May 29, 2008

(30) Foreign Application Priority Data

Nov. 15, 2004 (JP) ............................. 2004-330897

(51) Int. Cl.
*B65D 85/57* (2006.01)
(52) U.S. Cl. .................. 206/308.1; 206/309; 206/312; 312/9.58
(58) Field of Classification Search ............. 206/308.1, 206/309–312; 312/9.58; *G09B 33/01*
See application file for complete search history.

(56) References Cited

U.S. PATENT DOCUMENTS

| | | | | |
|---|---|---|---|---|
| 3,042,469 A | * | 7/1962 | Lowther | 312/9.58 |
| 3,389,942 A | * | 6/1968 | Karlheinz | 312/9.41 |
| 4,664,454 A | * | 5/1987 | Schatteman et al. | 206/308.1 |
| 4,770,474 A | * | 9/1988 | Ackeret | 206/308.1 |
| 5,099,995 A | * | 3/1992 | Karakane et al. | 206/308.1 |
| 5,150,354 A | * | 9/1992 | Iwata et al. | 206/308.1 |
| 5,232,275 A | * | 8/1993 | Yamazoe | 312/9.58 |

(Continued)

FOREIGN PATENT DOCUMENTS

JP  9-301470  11/1997

(Continued)

*Primary Examiner*—Ehud Gartenberg
*Assistant Examiner*—Andrew Perreault
(74) *Attorney, Agent, or Firm*—Wenderoth, Lind & Ponack, L.L.P.

(57) ABSTRACT

A case allows a disc to be inserted and removed smoothly without the case being opened, and also inhibits the accumulation of dust on the disc. The case has a movable holder and a fixed holder arranged inside, both of which individually define a circular arc. The movable holder is rotatable about its middle, and the rear of the fixed holder is fixed to the case so that the front portion of the fixed holder can flex. With the lever on the movable holder moved towards the bottom of the case so that the movable holder is rotated towards the front opening, a disc can be stored by inserting it through the front opening and causing the movable holder to rotate backwards and the front portion of the fixed holder to flex away. A stored disc can be removed by moving the lever towards the bottom of the case and causing the movable holder to rotate towards the front opening so that the disc is pushed by the rear portion of the movable holder, causing the front portion of the fixed holder to flex away as the disc emerges from the front opening.

7 Claims, 16 Drawing Sheets

U.S. PATENT DOCUMENTS

| | | | |
|---|---|---|---|
| 5,244,084 A * | 9/1993 | Chan | 206/308.1 |
| 5,425,451 A * | 6/1995 | Blase | 206/309 |
| 5,593,031 A * | 1/1997 | Uchida | 206/308.1 |
| 5,617,950 A * | 4/1997 | Chung | 206/308.1 |
| 5,662,216 A * | 9/1997 | Nesbitt et al. | 206/308.1 |
| 5,676,246 A * | 10/1997 | Gloger | 206/308.1 |
| 5,690,221 A * | 11/1997 | Yeh | 206/308.1 |
| 5,697,684 A * | 12/1997 | Gyovai | 312/9.42 |
| 5,713,464 A * | 2/1998 | Chang | 206/308.1 |
| 5,720,386 A * | 2/1998 | Allsop et al. | 206/308.1 |
| 5,779,037 A * | 7/1998 | D'Agaro et al. | 206/308.1 |
| 5,798,998 A * | 8/1998 | Fukushima et al. | 369/30.9 |
| 5,956,310 A * | 9/1999 | d'Alayer de Costemore d'Arc | 720/632 |
| 6,318,550 B1 * | 11/2001 | Giovinazzi | 206/308.1 |
| 6,347,701 B1 * | 2/2002 | Lee | 206/308.1 |
| 6,357,841 B1 * | 3/2002 | Alcini | 312/9.27 |
| 6,561,346 B1 * | 5/2003 | Lew et al. | 206/308.1 |
| 6,683,827 B1 * | 1/2004 | Omoto et al. | 206/308.1 |
| 6,874,626 B2 * | 4/2005 | Lew et al. | 206/308.1 |
| 2004/0217025 A1 * | 11/2004 | Timpe | 206/308.1 |
| 2004/0226837 A1 * | 11/2004 | Dewhurst et al. | 206/308.1 |

FOREIGN PATENT DOCUMENTS

| | | |
|---|---|---|
| JP | 2002-068351 | 3/2002 |
| JP | 2003-063585 | 3/2003 |
| JP | 2003-237873 | 8/2003 |

* cited by examiner

Fig.4
(a)
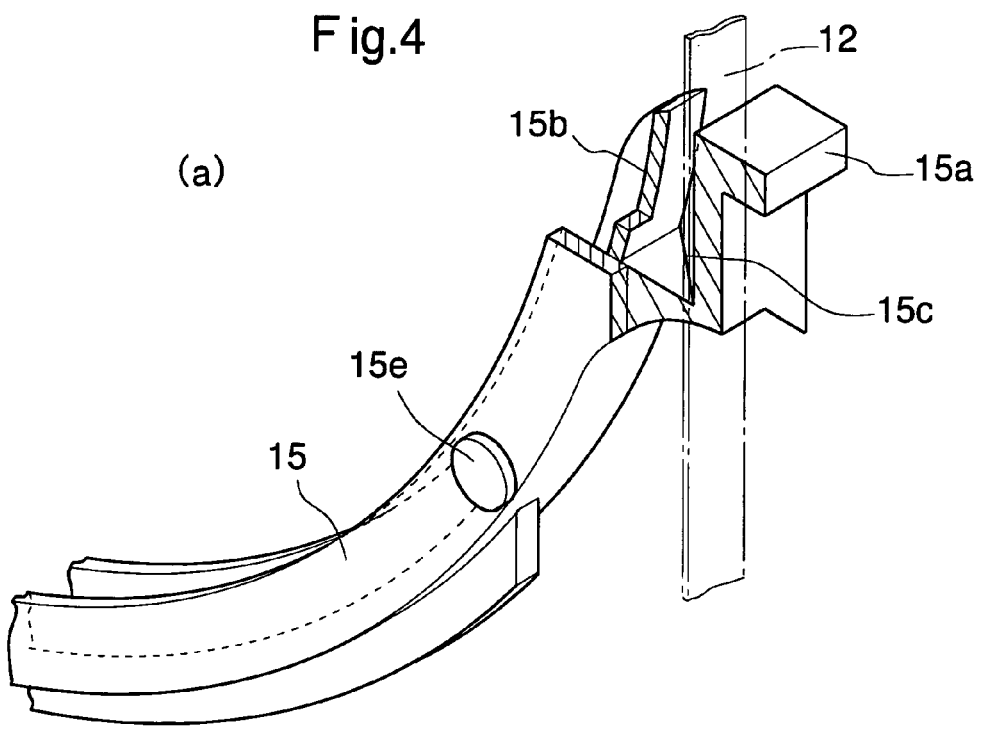
(b)
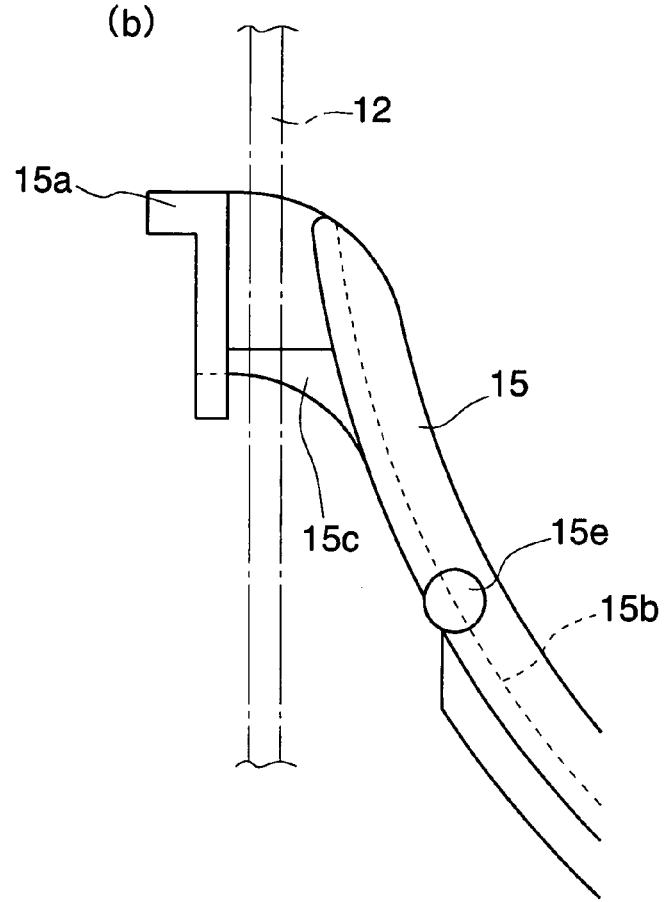

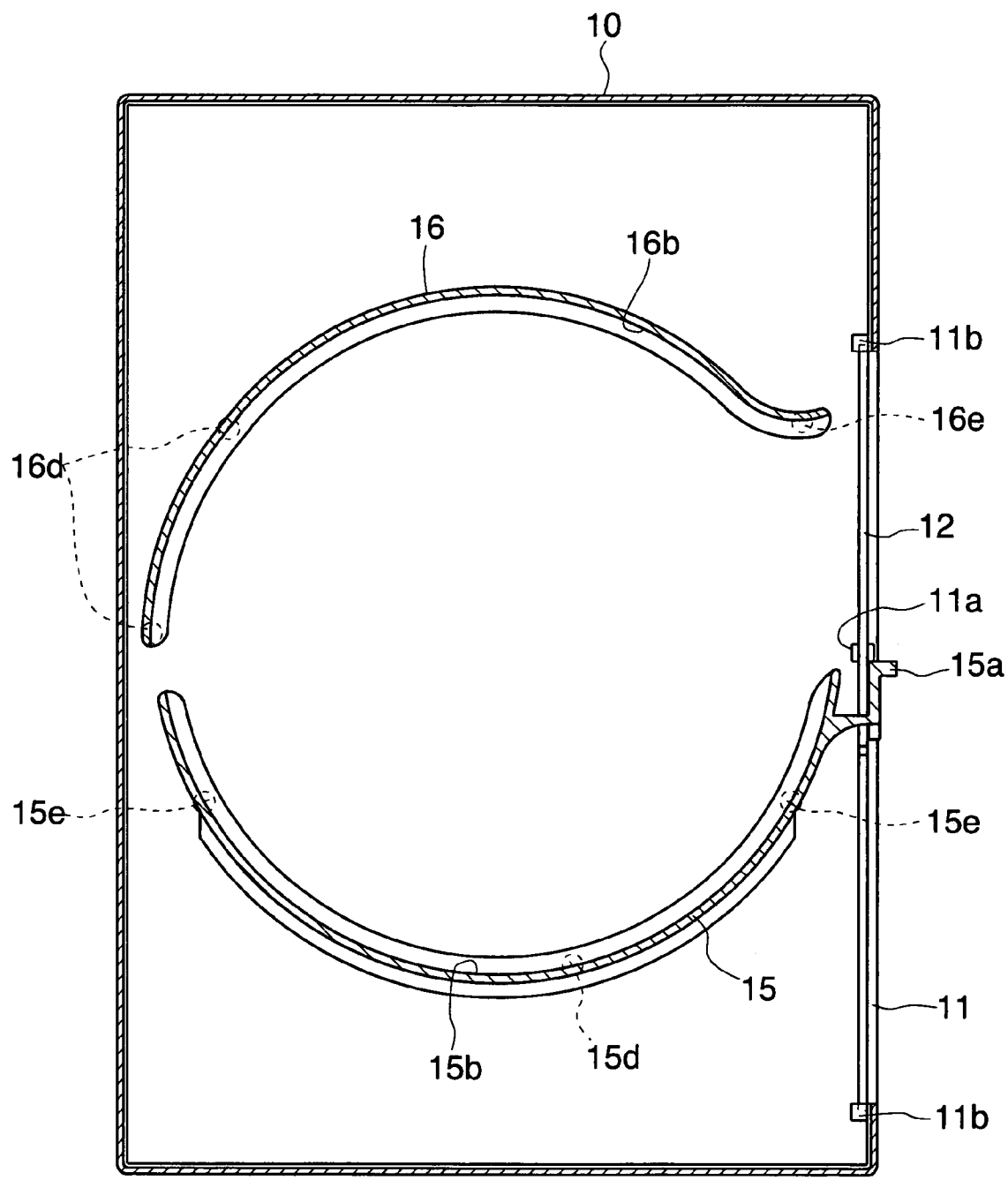

DISC CASE

BACKGROUND OF THE INVENTION

1. Technical Field

The present invention relates to a case for storing discs used as storage media for computer software, CDs, DVDs and so forth.

2. Description of the Related Art

Disc cases, typically, are flat and rectangular in shape, and are commonly divided down the center of the longitudinal edges so that one layer forms a cover while the opposing layer forms a housing case (See Kokai (Jpn. unexamined patent publication) No. 2003-63585, FIG. 5).

However, the disc cannot be removed from these common types of disc cases unless the cover is opened. These types of disc cases are generally stored in an upright position. Therefore, in order to retrieve a required disc, the disc case is removed from its storage position, the cover is opened, and the disc is removed. Removing these types of disc cases from their storage position, opening the cover and removing the disc is a difficult operation.

Insertion type cases are available that allow a disc to be inserted and removed from the side of the case. These insertion type disc cases have an elastic stopper installed on the interior of the case. A disc is stored in the case by causing the stopper to recede, and a disc is removed from the disc case by holding the disc by its central hole with a finger placed through the access gap in the side of the case and pulling it against said stopper (See Kokai (Jpn. unexamined patent publication No. 2003-63585), paragraphs 0010 and 0011, and FIG. 2)).

In the insertion type disc cases described above, the insertion slot (front opening) and the access gap are open and exposed, and dust enters the case through these points, and therefore dust readily accumulates on the disc.

Furthermore, there is no guide to aid insertion and removal, and there is therefore the risk of the disc being damaged or scratched.

SUMMARY OF THE INVENTION

One object of the present invention is to facilitate the smooth insertion and removal of discs, and another object is to inhibit the accumulation of dust or other foreign particles on the disc.

In order to achieve the first object described above, the present invention uses a pair of holders to hold the disc and guide it into the storage position.

This has the effect of inhibiting damage to or scratching of the disc upon insertion or removal, and also facilitates smooth insertion and removal.

In order to achieve the second object described above, the present invention has a lid attached at the insertion slot (front opening).

The lid inhibits the infiltration of dust.

The present invention uses a pair of holders to hold the disc and guide it into the storage position, and this inhibits damage to and scratching of the disc upon insertion and removal, and also facilitates smooth insertion and removal of discs. Furthermore, the lid attached at the disc gate inhibits the infiltration of dust into the case, and inhibits the accumulation of dust on the disc.

BRIEF DESCRIPTION OF THE DRAWINGS

FIGS. 4A and 4B show the lever of the movable holder for the embodiment shown in FIG. 1.

FIG. 4A shows a partially exposed perspective view, and FIG. 4B shows the right side view of that shown in FIG. 4A.

FIG. 7A shows a view of the operation of the embodiment shown in FIG. 1.

DETAILED DESCRIPTION OF THE INVENTION

Figure 1:
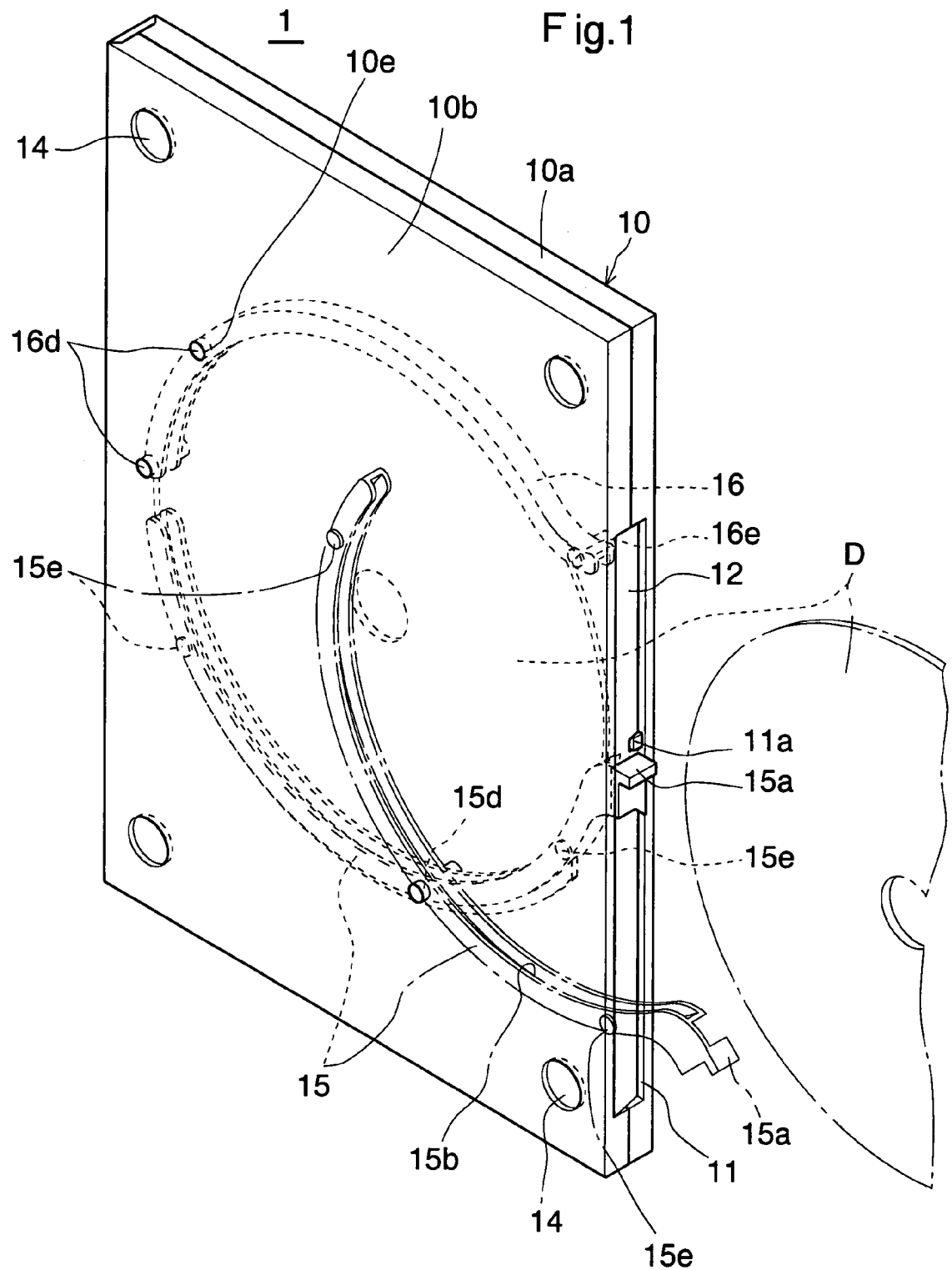
FIG. 1 shows a perspective view of a first embodiment of the invention.
Figure 2:
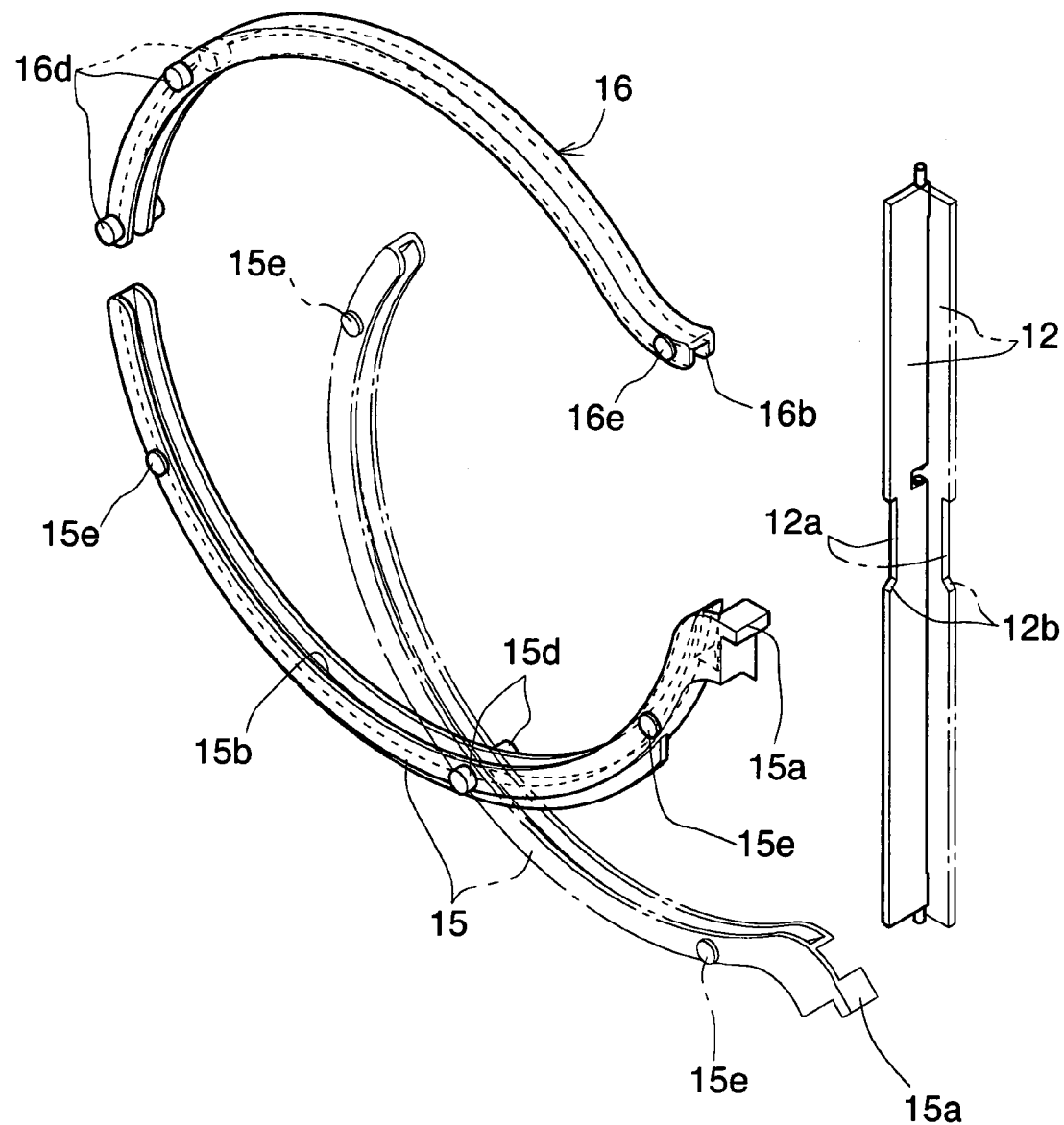
FIG. 2 shows a perspective view of the main parts for the embodiment shown in FIG. 1.

An embodiment of the present invention comprises, for example, a flat rectangular shaped case with a front opening along one of its sides to permit insertion and removal of a disc; a movable holder and a fixed holder arranged in the interior of the case spanning the space from the front opening to the rear of the case in a position facing each other on either side of the front opening. The movable holder has a lever that protrudes from the front opening and is shaped so that when the disc is in the storage position it forms a circular arc from the lever around the periphery of the disc to its rear. The movable holder is fixed to the case so as to be rotatable about its middle. The fixed holder forms a circular arc from the rear portion of the disc around its periphery to the front portion of the disc, and is fixed to the case at the rear in such a manner that the front portion is able to flex.

In this configuration, with the lever of the movable holder moved towards a corner of the case so that the movable holder rotates towards the front opening, a disc is stored in the case by inserting it through the front opening and rotating the movable holder backwards while at the same time causing the front portion of the fixed holder to flex away. From this storage position, the disc is removed by moving the lever towards a corner of the case, causing the movable holder to rotate towards the front opening so that the rear portion of the movable holder brings the disc forward while at the same time causing the front portion of the fixed holder to flex away.

A lid is fitted to the front opening so that the lid opens by rotating about the lengthwise axis of the case. The lever has an angled face that contacts with the leading edge of the lid, and this angled face is angled gradually towards the lid and rear of the case so that when the lever is moved towards a corner of the case the angled face pushes the lid open. With the case formed so that the lid opens and closes according to the movement of the lever, the disc can be smoothly inserted and removed.

Furthermore, with grooves set into the movable holder and fixed holder so that the periphery of the disc fits into the grooves, the lateral surface (recorded surface) of the disc is prevented from touching the case.

In addition, the flat rectangular case of the current invention is also comprised of two layers, a base layer (the storage layer) and a cover layer that divide the case lengthwise about its center and which can be folded open. The enclosing case is formed when these layers are closed together. A plate portion is cut and opened out from the cover layer like the page of a book and fixed at the point where the cover layer meets the base layer. With the movable holder and fixed holder supported by this plate and the base layer, the holders remain supported even when the case is opened by separating the cover layer from the base layer. Thus, when storing a disc, insertion and removal is still possible when the case is in the open position. Therefore, storage of the disc is not impeded by opening the case to view a booklet (slip) stored within the cover layer that may describe the recorded contents of the disc (such as music or stories for example).

Figure 3:
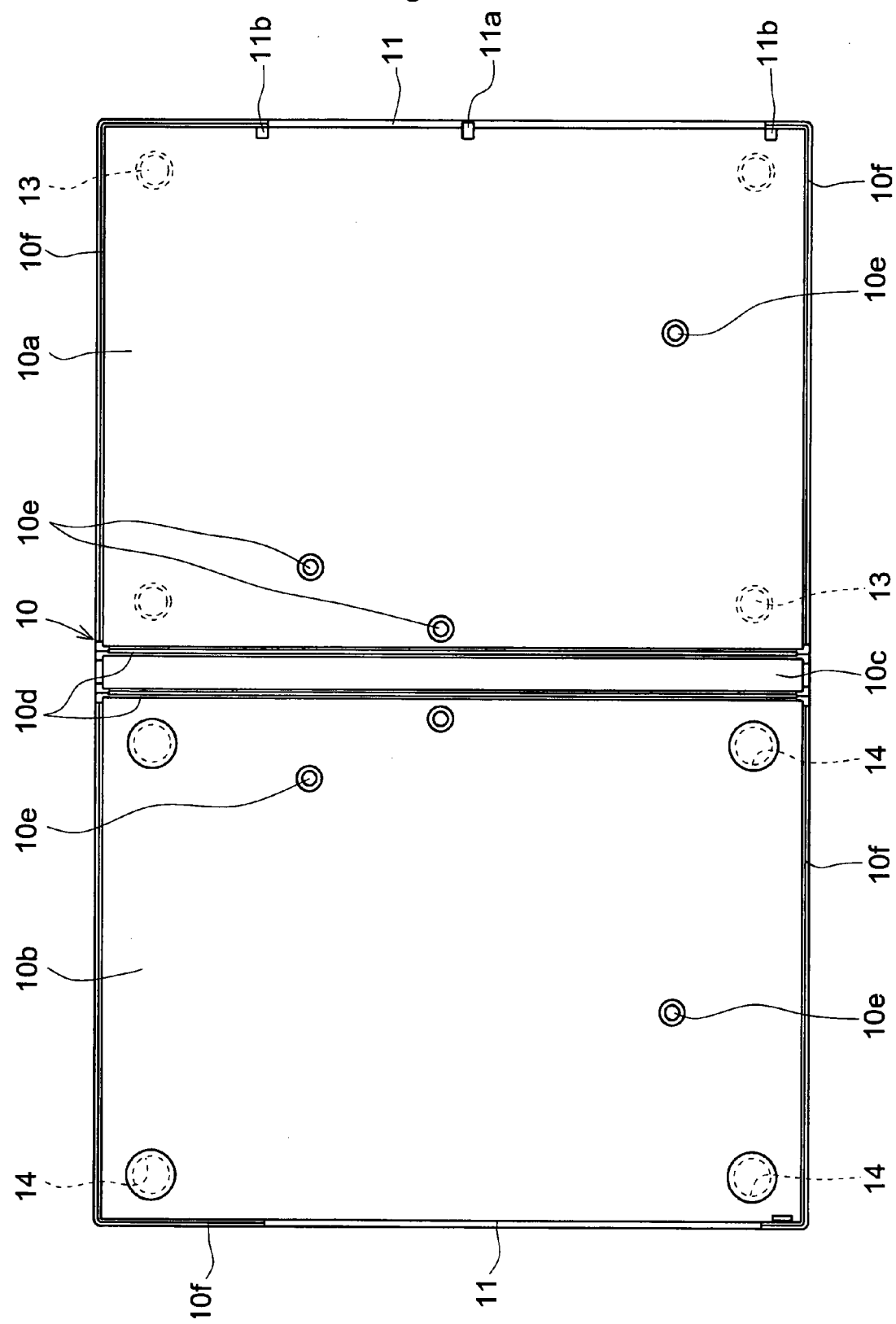
FIG. 3 shows a developed view of the case body for the embodiment shown in FIG. 1.

FIGS. 1 to 8 show one embodiment of the present invention, and the case body 10 in this embodiment is made of transparent plastic, and comprised of a cover layer 10a and base layer 10b as shown in FIG. 3. The cover layer 10a and base layer 10b are joined along crease lines 10d to the spine 10c which forms the rear surface of the case. Furthermore, there are lateral walls 10f around the periphery of the case body 10 excluding the spine 10c that sits between the cover layer 10a and base layer 10b. Therefore, as shown in FIG. 1, a flat rectangular case (or case body) is formed when the cover layer 10a and base layer 10b are folded together about the crease lines 10b. The cover layer 10a and base layer 10b are joined together by an appropriate bonding, sealing or adhesion method to form a single body.

The lateral walls 10f of the cover layer 10a and base layer 10b on the side of the case opposing the spine 10c have a lengthwise indentation along their edges so that they form the front opening 11 for inserting and removing the disc D when brought together (i.e. when the case body is closed). A lid 12 is set at the opening 11 and attached to bearings 11b at each end of the opening so that it can rotate about the lengthwise axis of the case 1. The bearings 11b of the lid 12 may be attached to either the cover layer 10a or the base layer 10b, however it is preferable that they be attached to the layer on which the movable holder 15 and fixed holder 16, detailed below, remain, and in which the disc D is held when the cover layer 10a and base layer 10b are folded into the open position (refer to FIG. 13).

Figure 5:
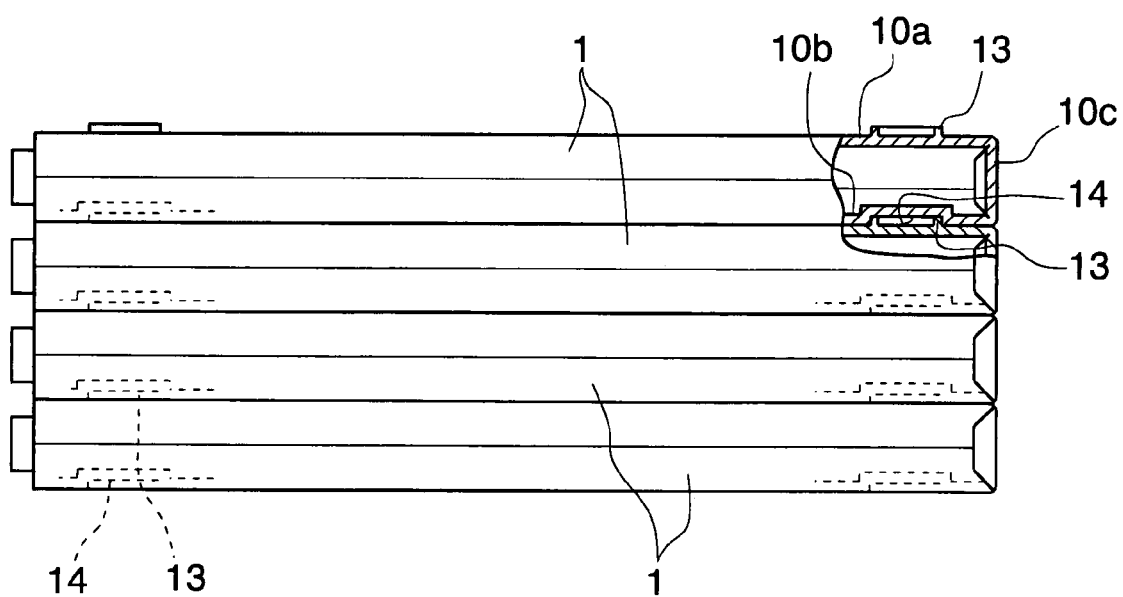
FIG. 5 shows a view of the operation of the embodiment shown in FIG. 1.
Figure 6:
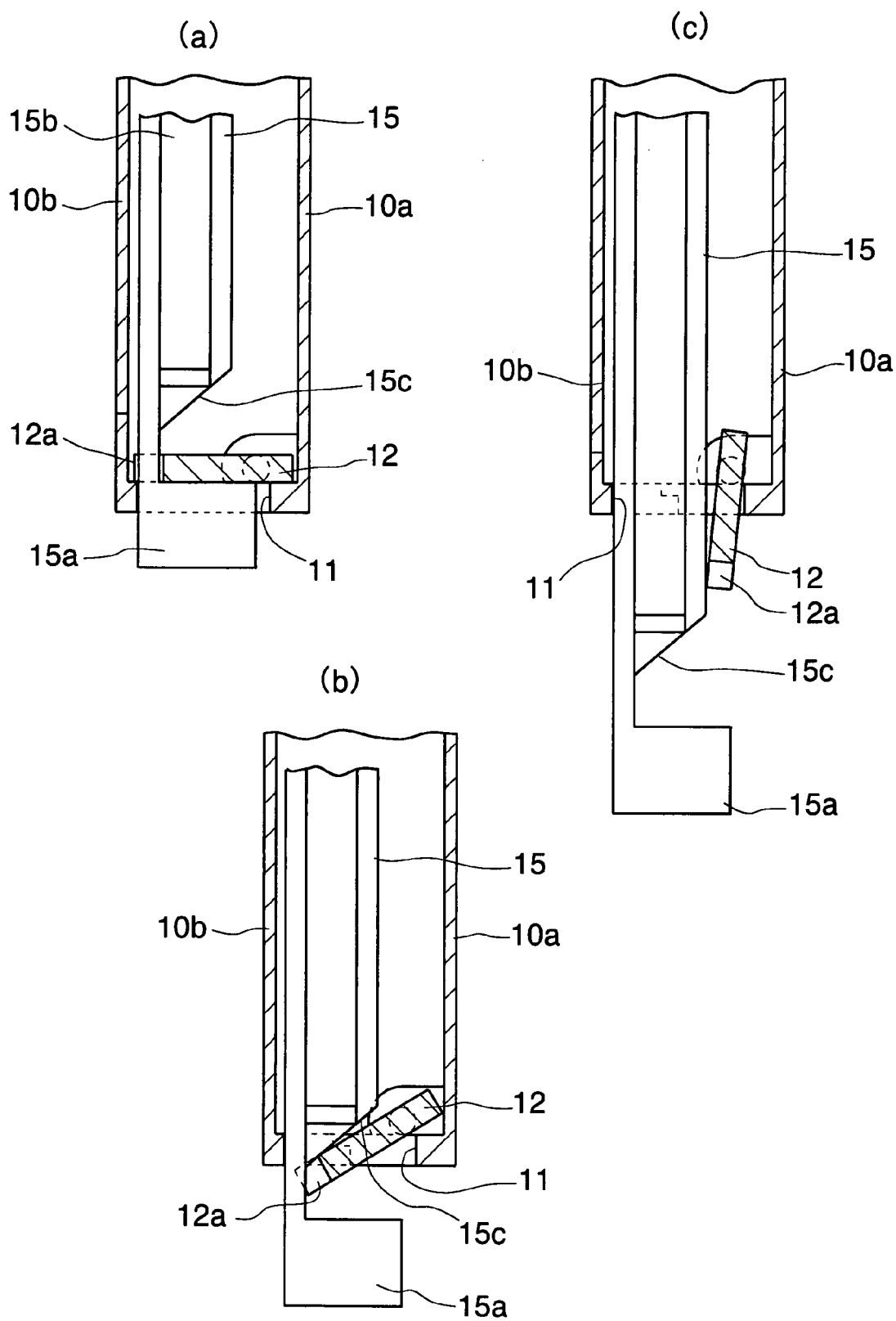
FIG. 6 shows a view of the operation of the embodiment shown in FIG. 1.

There are convex portions 13 arranged at each of the four corners of the cover layer 10a of the case body 10, and concave portions 14 at each of the four corners of the base layer 10b into which said convex portions 13 fit. Therefore, as shown in FIG. 5, when such cases 1 are stacked together or set side by side, the position of each case 1 is guided according to the convex portions 13 meeting and fitting into the concave portions 14.

The case 1 has a movable holder 15 and a fixed holder 16, both made of plastic and arranged in opposing positions so as the span the space between each end of the front opening 11 and the rear of the case 1. The movable holder 15 has a lever 15a that protrudes from the front opening 11 and is shaped so that when the disc D is in the storage position it forms a circular arc from said lever 15a around the periphery of the disc D to the rear. The movable holder 15 is fixed to the case 1 so as to be rotatable about its middle. The pivot pin 15d may be attached to the holder 15 or to the case 1 (case body 10).

The fixed holder 16 forms a circular arc from the rear portion of a stored disc D around its periphery to the front portion of the disc D, and is fixed to the case 1 at the rear in such a manner that the front portion is able to flex. The fixed holder 16 is fixed to the case 1 (case body 10) by pins 16d at two points. The pins 16d may be attached to the holder 15 or to the case 1 (case body 10).

Now, referring to the Figures, 11a is a guide protrusion for the lid 12 and is attached to the front opening 11. 15e and 16e are guide pins attached to each holder, 15 and 16, respectively, and slide across the interior surface of the case body 10 so that the holders 15 and 16 move smoothly. Further, 10e shown in FIG. 3 depicts holes into which the pivot pin 15d and the pins 16d fit so as to be fixed in a rotatable fashion.

Guide grooves 15a and 16a are formed on the inner opposing surfaces of the movable holder 15 and the fixed holder 16, respectively, so that the periphery of the disc D fits thereinto. When a disc D is stored between the two holders 15 and 16, the periphery of the disc D fits into these grooves 15a and 16a so that the lateral surface (recorded surface) of the disc does not come into contact with the case 1, preventing damage to the recorded surface of the disc.

The lever 15a protrudes from the front opening 11 through a lengthwise indentation 12a near the center of the edge of the lid 12, and due to the elasticity of the movable holder 15, the lever is locked in place by the indentation 12a so that it does not move excessively.

One side of the indentation 12a has a tapered edge 12b that slopes downward towards one of the corners (the lower right corner in FIG. 2) of the case 1. When the lever 15a is moved towards that particular corner of the case 1, the lever 15a is guided by the tapered edge 12b from the indentation 12a onto the leading edge of the lid 12, and from there it moves smoothly along the leading edge towards said corner.

Further, the lever 15a has an angled face 15c that contacts with the leading edge of the lid 12, and this angled face 15c is angled gradually towards the lid and rear of the case (as shown in FIG. 4). Therefore, when the lever 15a is moved towards a corner of the case 1 the angled face 15c pushes the lid 12 so that it rotates open (in FIG. 1 it rotates towards the lower side), and the front opening 1 opens sufficiently (this progression is shown in FIGS. 6A, 6B and 6C) for the disc D to be inserted or removed. With the case 1 formed so that the lid 12 opens and closes according to the movement of the lever 15a, the disc D can be smoothly inserted and removed.

Figure 7B:
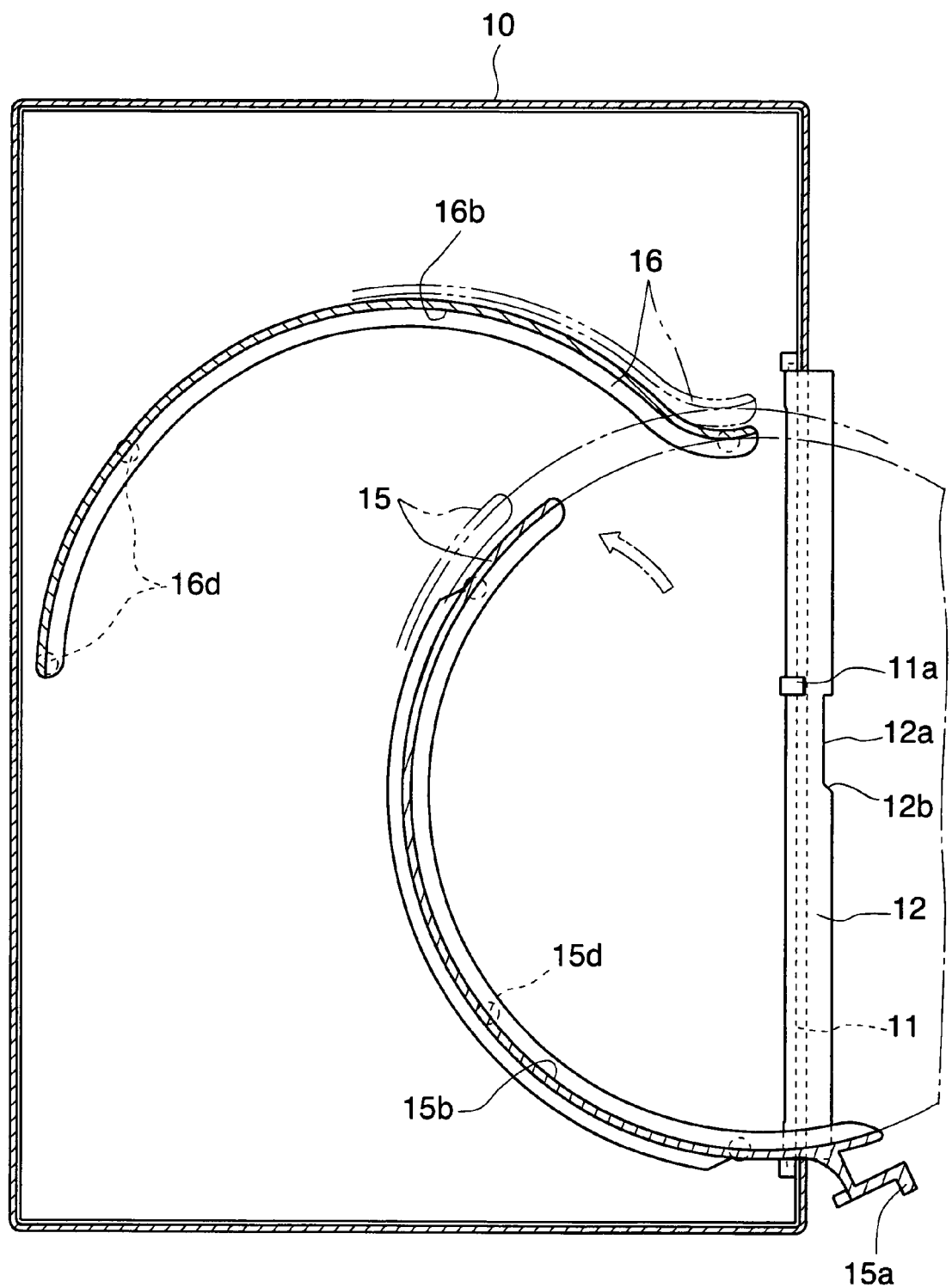
FIG. 7B shows a view of the operation of the embodiment shown in FIG. 1.
Figure 7C:
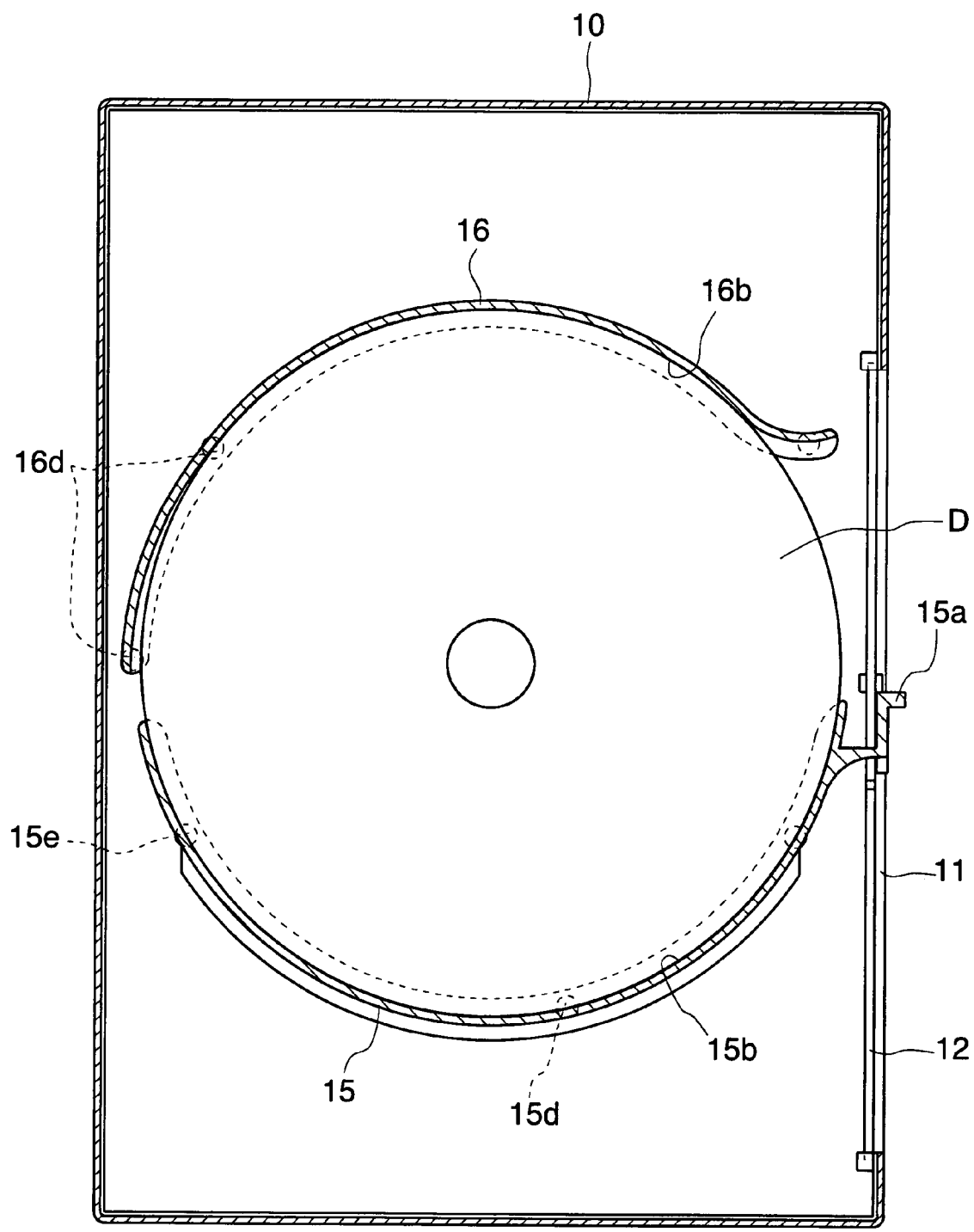
FIG. 7C shows a view of the operation of the embodiment shown in FIG. 1.

The structure of this embodiment of the disc case 1 has been described above, and now its operation will be described. With the lever 15a in a position moved towards a corner of the case 1, as shown in the progression from FIG. 7A to FIG. 7B, storage of the disc D is accomplished by first inserting it into the case 1 through the front opening 11, as shown by the chain-dash line in FIG. 7B. With the disc D fitted into the grooves, 15b and 16b, of the holders, 15 and 16 respectively, as shown by the chain-double-dash line in FIG. 7B, the front portion of the fixed holder 16 is made to bend while the movable holder 15 is rotated. Then finally, as shown in FIG. 7C, the disc D reaches the storage position inside the case 1 so that it is held firmly between the holders, 15 and 16. Insertion of the disc D into the case 1 may be accomplished by pushing directly on the disc D, however insertion may also be achieved by gripping the lever 15a and moving it to a position around the center of the front opening 11 so that the rotation of the movable holder 15 pushes the disc D inwards.

Figure 8A:
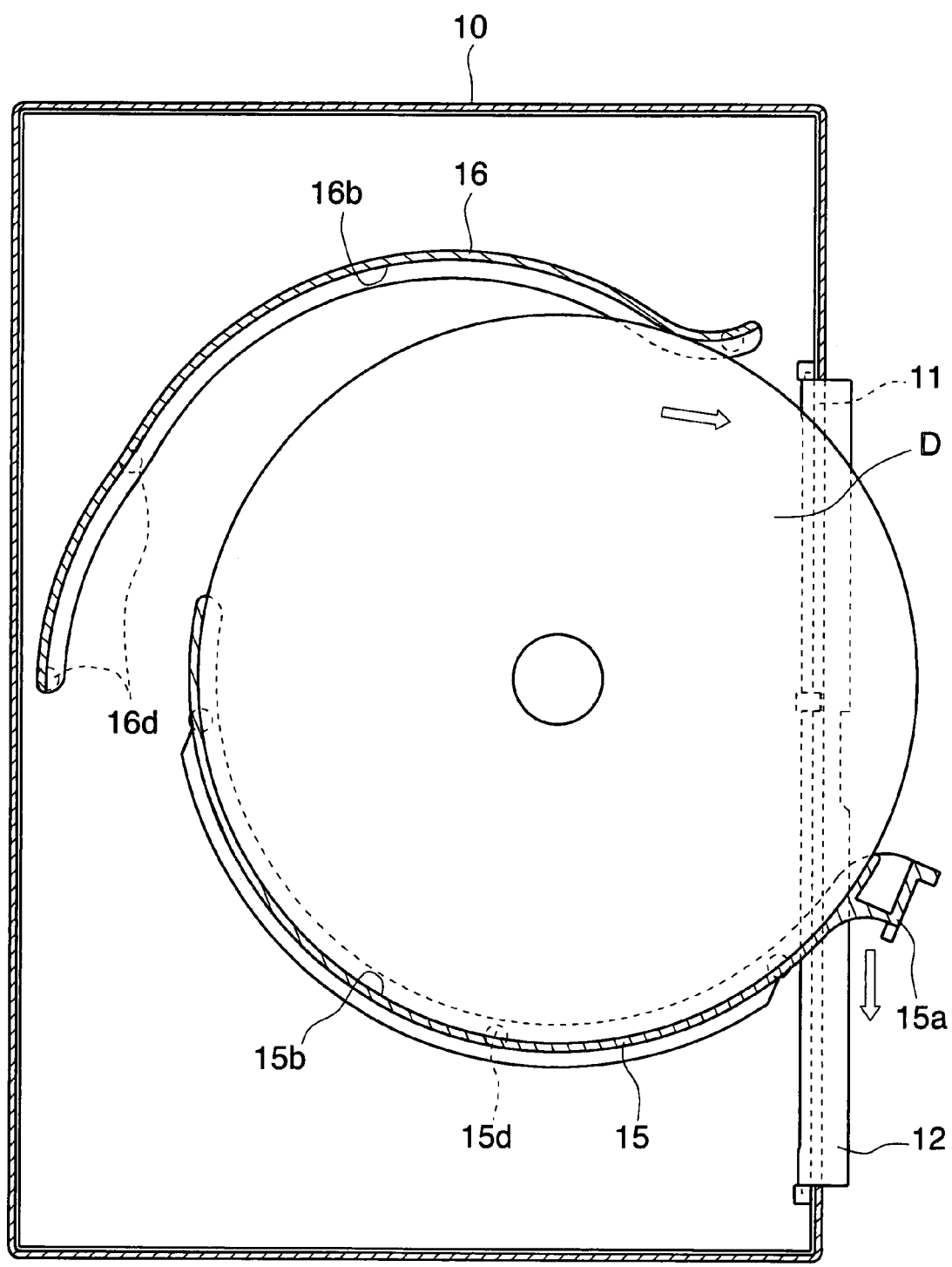
FIG. 8A shows a view of the operation of the embodiment shown in FIG. 1.
Figure 8B:
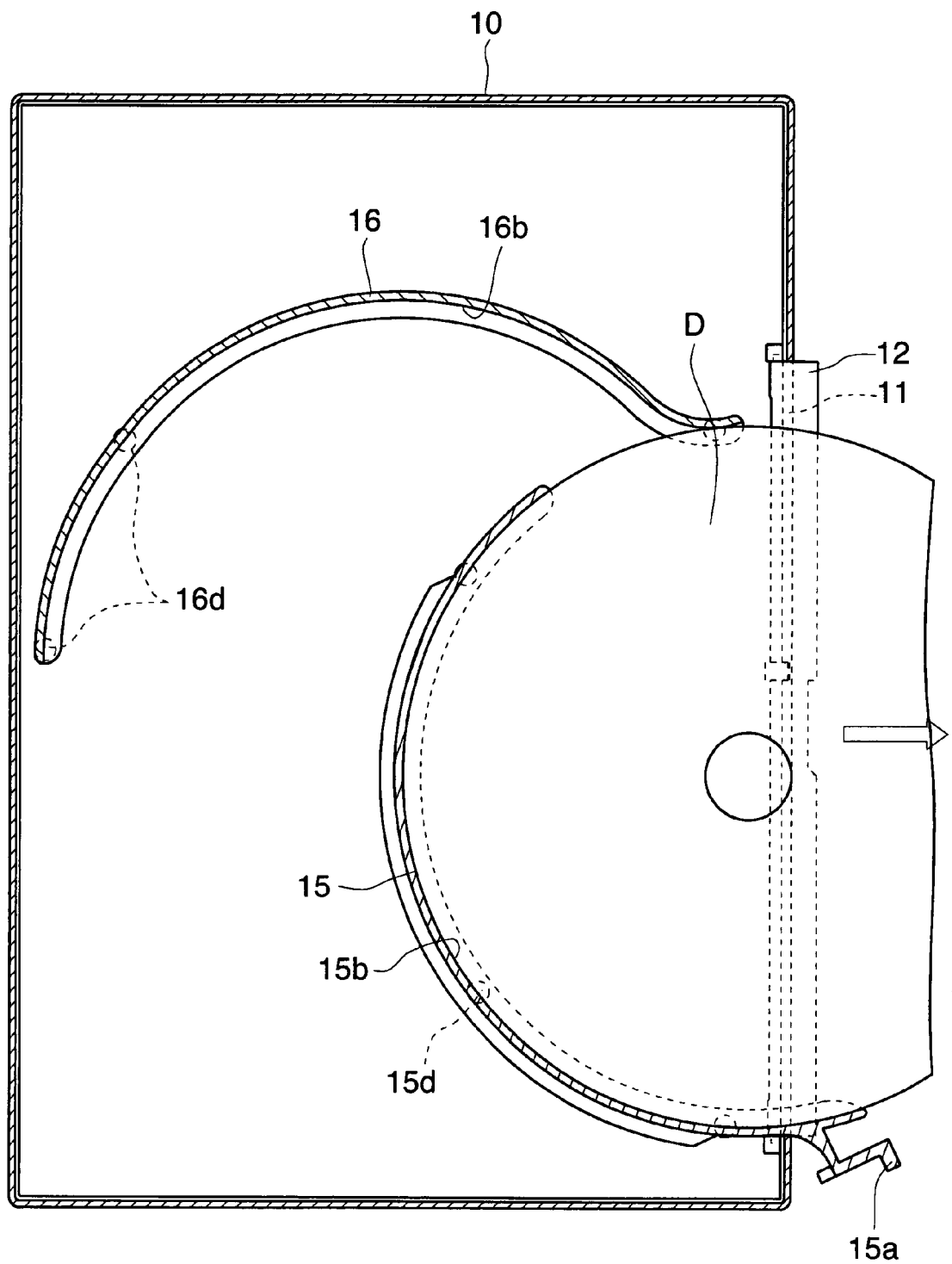
FIG. 8B shows a view of the operation of the embodiment shown in FIG. 1.
Figure 9:
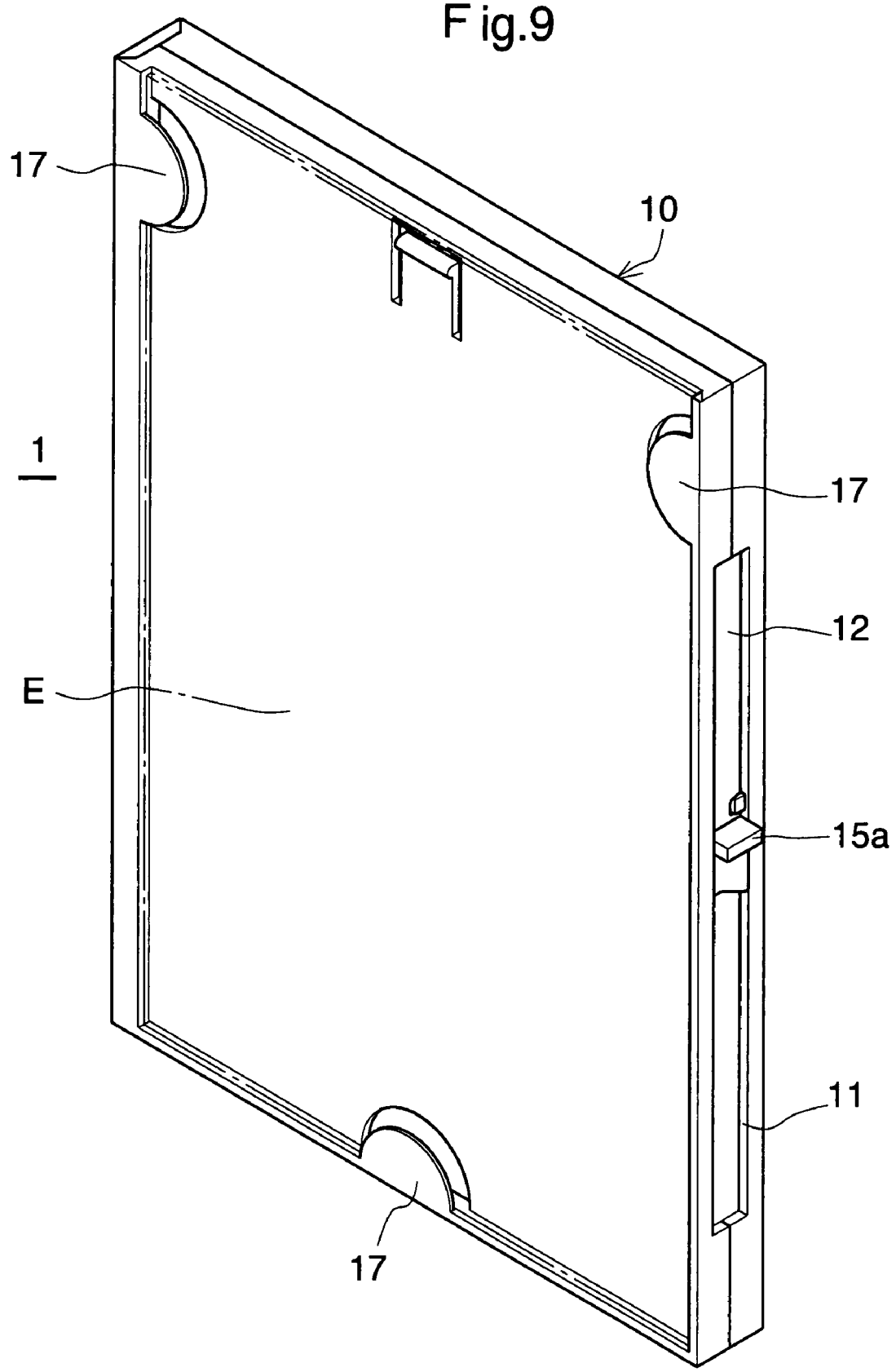
FIG. 9 shows a perspective view of a second embodiment of the invention.

To remove a disc D from the storage position, the lever 15a is moved towards a corner of the case 1 so that the movable holder 15 rotates and pushes the disc D outwards with its rear portion in the direction indicated by the arrow in FIG. 8A. In this manner, as the disc D is pushed outwards through the front opening 11, it pushes the front portion of the fixed holder 16 upwards as shown in FIG. 8B, and finally the disc is removed from the case.

As described above, a disc D can be inserted and removed from the case 1 by moving the lever 15a, and therefore when a plurality of cases 1 are placed together, and in particular when they are set side by side in an upright position, discs D can be inserted and removed from the cases 1 without the need for the case 1 itself to be taken out of its storage location.

Fitting projections 17 can be arranged around the side or at the corners of the cover layer 10a or the base layer 10b of the case 1. Booklets or slips E such as lyric sheets, bromide prints or photographs can be stored in the face of the case 1 and held there by the fitting projections 17. The convex portions 13 and concave portions 14 described above may also be present in this configuration.

Figure 10:
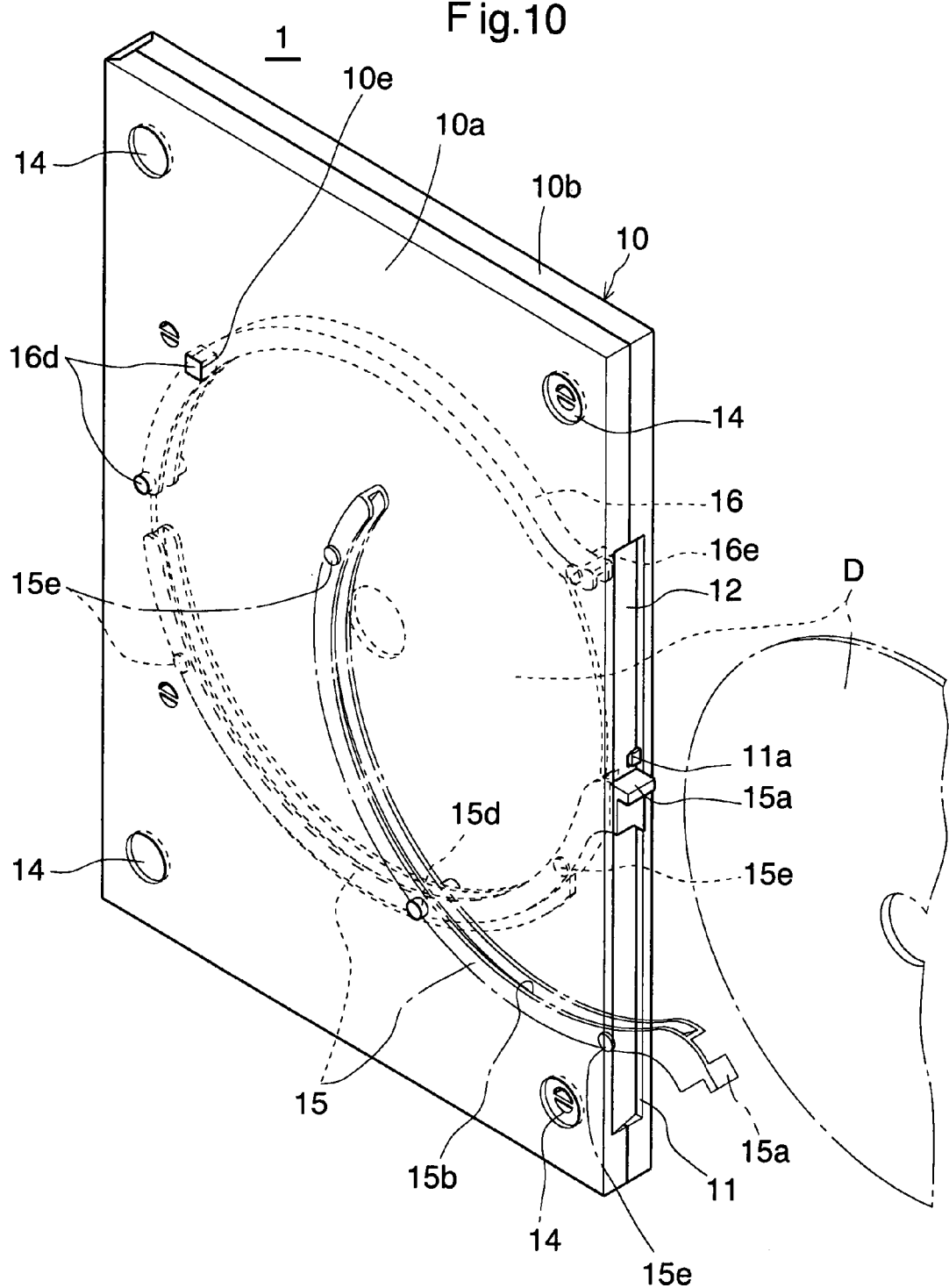
FIG. 10 shows a perspective view of a third embodiment of the invention.
Figure 11:
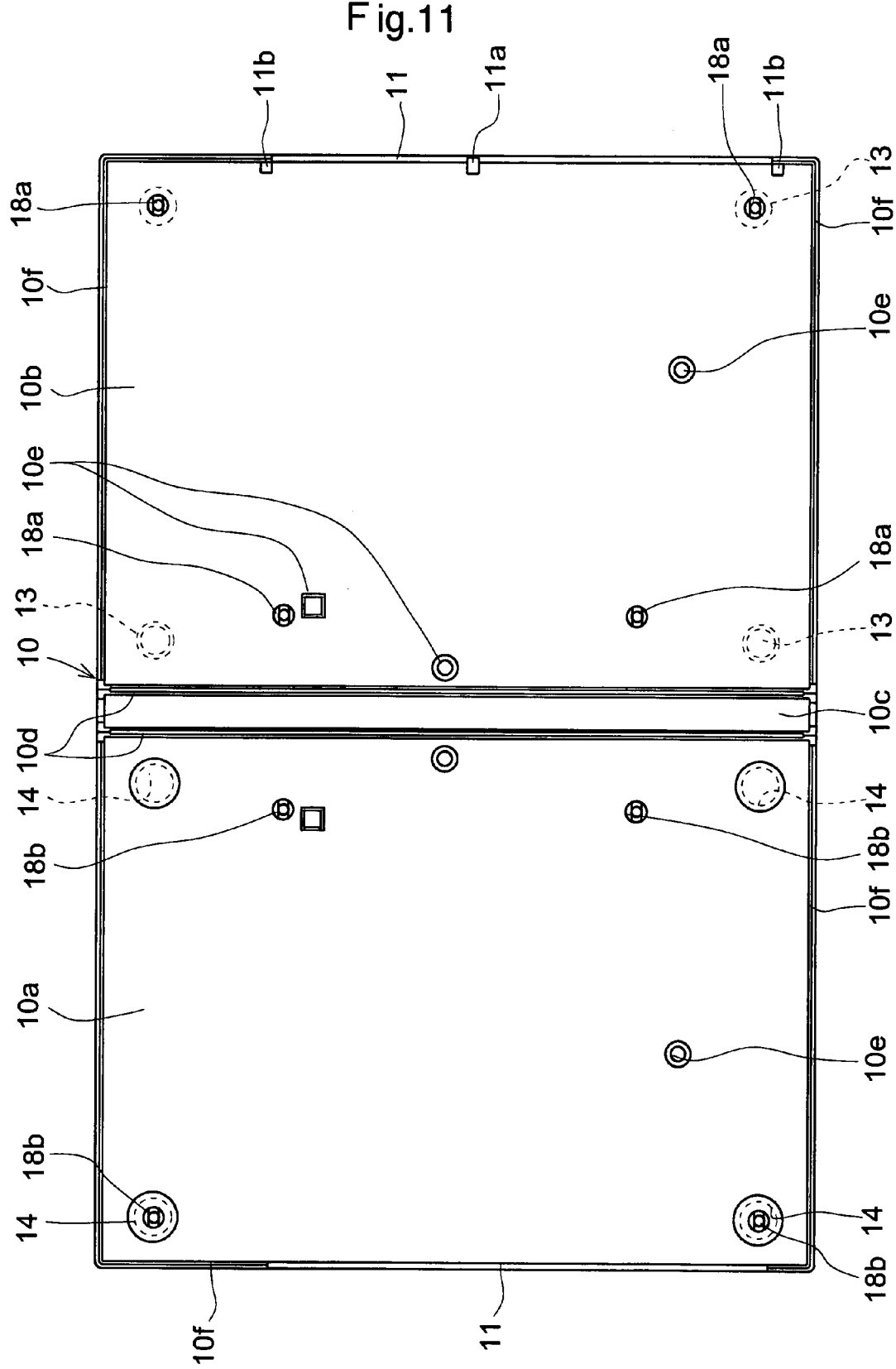
FIG. 11 shows a developed view of the case body for the embodiment shown in FIG. 10.

Further, as shown in FIG. 10 and FIG. 11, the cover layer 10a and base layer 10b of the case 1 may be fastened together by fastening projections 18b and receiving holes 18a set into the cover layer 11a and base layer 11b which fit together and are fastened together.

Figure 12:
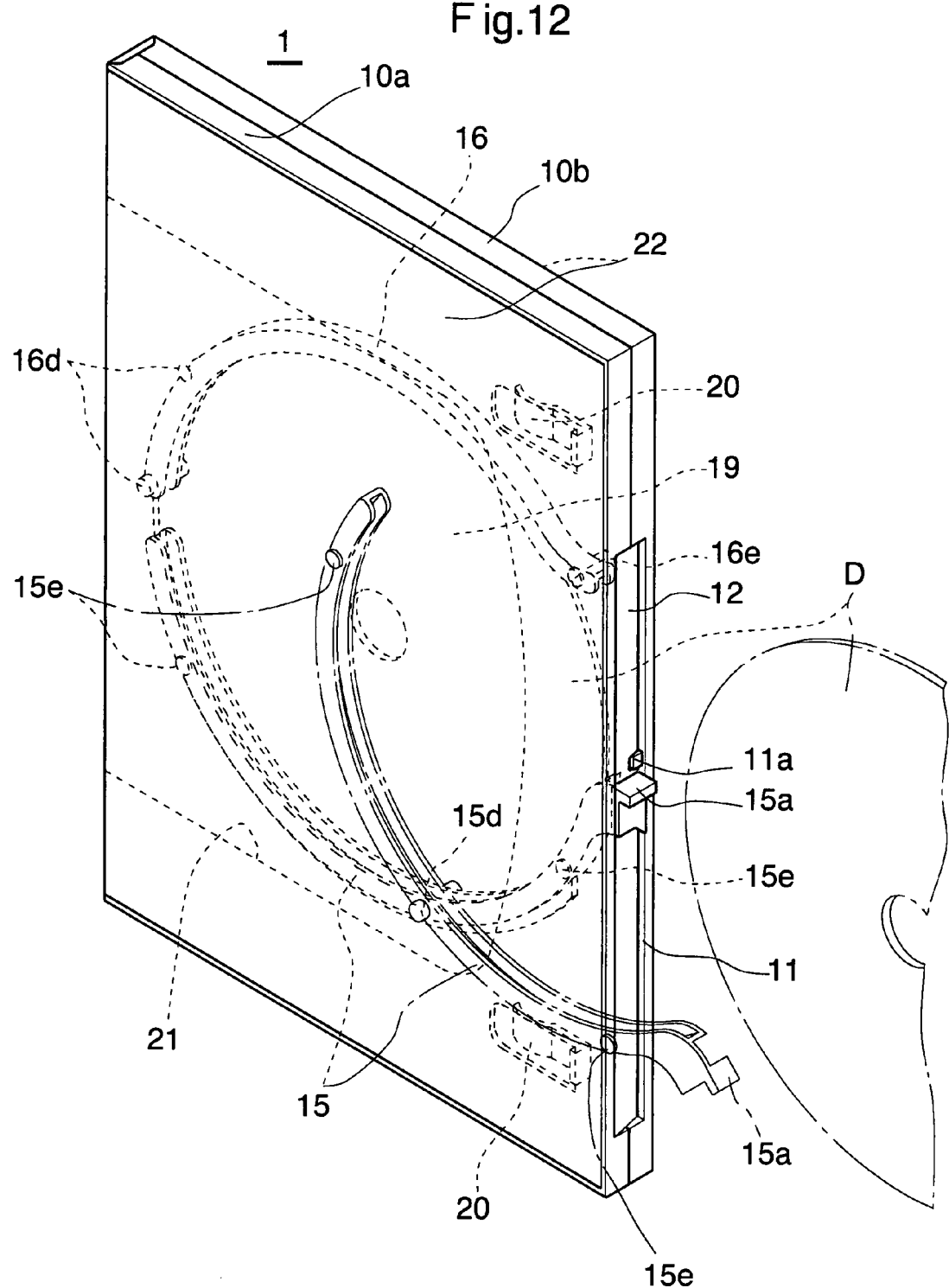
FIG. 12 shows a perspective view of a fourth embodiment of the invention.
Figure 13:
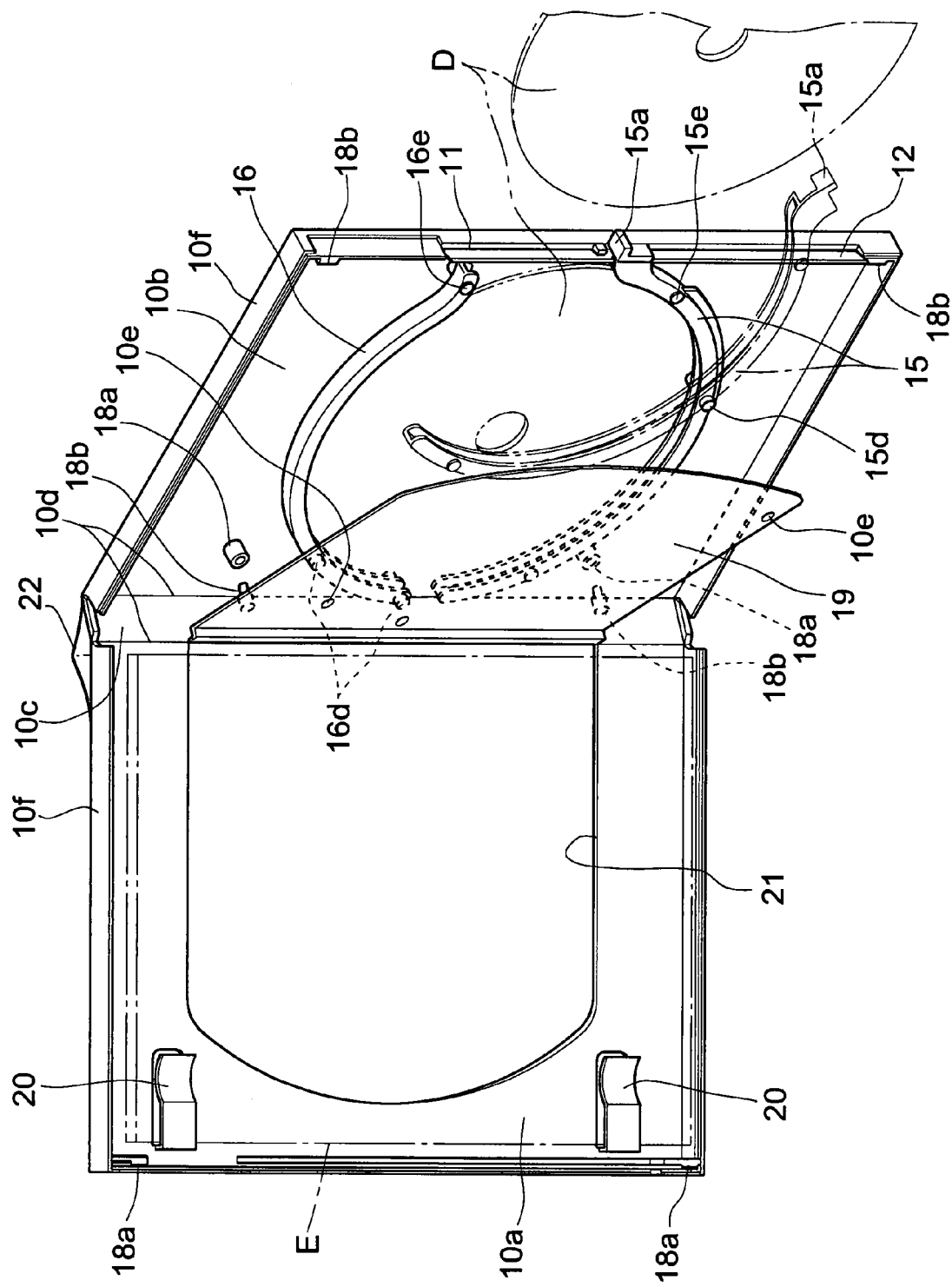
FIG. 13 shows a perspective view of the embodiment shown in FIG. 12 in the open position.

Further, as shown in FIG. 12 and FIG. 13, the flat rectangular case 1 is comprised of two layers, the cover layer 10a and the base layer 10b, that divide the case lengthwise about its center and that fold open, and an enclosing case 1 is formed when the cover layer 10a and base layer 10b are closed together. A plate portion 19 is cut and opened out from the cover layer 10a like the page of a book and fixed at the point (i.e., line) where the cover layer 10a meets the base layer 10b, and the movable holder 15 and fixed holder 16 can be supported by said plate 19 and the base layer 10b.

With this configuration, even if the cover layer 10a and base layer 10b are separated and folded open as shown in FIG. 13, the movable holder 15 and fixed holder 16 are supported by the plate 19 and the base layer 10b, and so insertion, removal and storage of a disc D is still possible. Therefore, storage of the disc D is not impeded by opening the cover layer 10a to view booklets E (slips) such as lyrics cards, bromide prints or photographs stored within said cover layer 10a. Hooks 20 set into the interior surface of the cover layer 10a will hold the booklets E in position. 21 in FIG. 13 indicates the void in the cover layer 10a produced by cutting out the plate portion 19.

The outer surface of these embodiments of each case 1 (the cover layer 10a and base layer 10b) are wrapped with a transparent film 22. Each side (the sides that run parallel to the front opening 11) of said transparent film 22 is fixed to the longitudinal sides of the cover layer 10a and base layer 10b so that a disc D title sheet or the like can be inserted between said film 22 and the case 1.

What is claimed is:

1. A flat rectangular case comprising:
   a case body having a front opening along one edge for inserting and removing a disc and a rear opposite the front opening;
   a movable holder set inside of said case body; and
   a fixed holder set inside of said case body, said fixed holder and said movable holder disposed in opposing positions so as to span the space between the rear of the case body and each end of the front opening such that the disc can be stored between said fixed holder and said moveable holder;
   wherein said movable holder has a lever that protrudes from said front opening, is shaped so as to form a circular arc from said lever around a periphery of the stored disc to the rear of the case body, and fixed to the case body so as to be rotatable about a middle of said moveable holder;
   wherein said fixed holder is shaped so as to form a circular arc from a rear portion of the periphery of the stored disc around to a front portion of the stored disc, and fixed to the case body at a rear portion of the fixed holder in such a manner that a front portion of the fixed holder is able to flex;
   wherein when the lever on the movable holder is moved towards a corner of the case body so that said movable holder is rotated towards said front opening, the disc can be stored by inserting the disc through the front opening to cause the movable holder to rotate backwards and the front portion of the fixed holder to flex, thereby enabling the disc to be stored in a storage position; and
   wherein the disc can be removed from the storage position by moving the lever towards the corner of the case body, causing the movable holder to rotate towards the front opening so that the disc is pushed by a rear portion of said movable holder, causing the front portion of the fixed holder to flex as the disc emerges from the front opening; further comprising a lid rotatable about a lengthwise axis of the case body attached at the front opening, and wherein the lever has an angled face that contacts with the leading edge of said lid, and wherein said angled face is angled gradually towards the lid and rear of the case body so that when the lever is moved towards the corner of the case body the lid is caused to open due to the angled face sliding across said leading edge of said lid.

2. The flat rectangular case of claim 1, wherein the case body includes a cover layer and a base layer that meet along a line and divide the case body lengthwise about its center, the cover layer and the base layer being configured to fold open such that an enclosing case body is formed by closing the cover layer and base layer together; wherein said cover layer has a plate portion cut and opened out from said cover layer and fixed along the line where the cover layer meets the base layer, and wherein said movable holder and fixed holder are supported by the plate portion and the base layer, respectively.

3. The flat rectangular case of claim 1, wherein grooves are set into the movable holder and the fixed holder such that the periphery of the disc fits into said grooves.

4. The flat rectangular case of claim 2, wherein grooves are set into the movable holder and the fixed holder such that the periphery of the disc fits into said grooves.

5. The flat rectangular case of claim 1, wherein said fixed holder is fixed to said case body at two points such that the rear of said fixed holder is not moveable relative to said case body.

6. The flat rectangular case of claim 1, wherein said fixed holder is fixed to said case body in such a manner that the rear of said fixed holder is not moveable relative to said case body.

7. The flat rectangular case of claim 2, wherein the enclosing case body is configured such that only a single disk is positionable within said enclosing case body.

* * * * *